E. S. JEWETT.

Broadcast-Seeder.

No. 48,949.

Patented July 25. 1865.

UNITED STATES PATENT OFFICE.

EDWARD S. JEWETT, OF LIMA, MICHIGAN.

BROADCAST SEEDING-MACHINE.

Specification forming part of Letters Patent No. 48,949, dated July 25, 1865; antedated July 19, 1865.

*To all whom it may concern:*

Be it known that I, E. S. JEWETT, of Lima, in the county of Washtenaw and State of Michigan, have invented a new and Improved Broadcast Seeding-Machine; and I do hereby declare that the following is a full, clear, and exact description thereof, which will enable others skilled in the art to make and use the same, reference being had to the accompanying drawings, making a part of this specification, in which—

Figure 1:
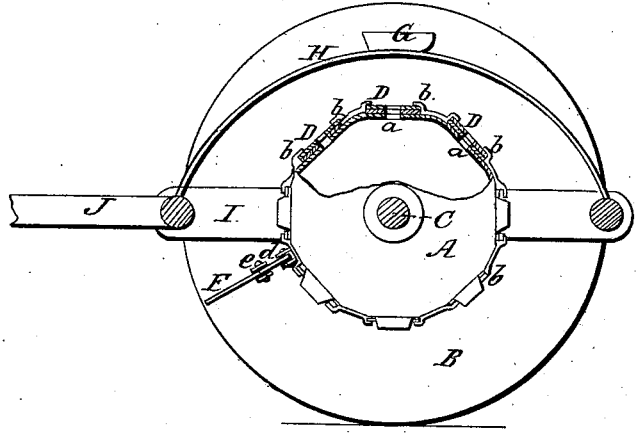
Figure 2:
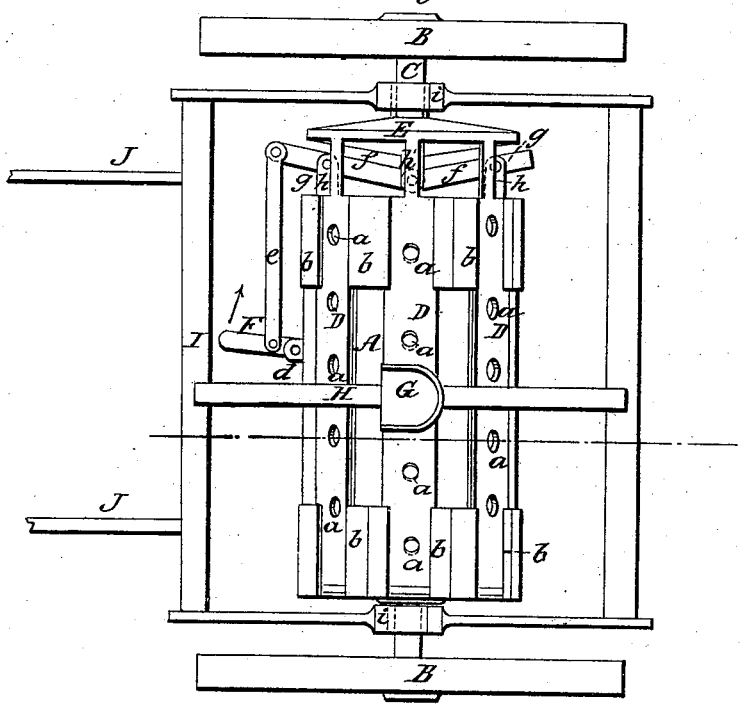

Figure 1 represents a transverse vertical section of my invention. Fig. 2 is a plan or top view of the same.

Similar letters of reference indicate like parts.

This invention relates to a seeding-machine which serves to distribute seeds of any desired description or fertilizers—such as guano, plaster-paris, wood-ashes, &c.—in such quantities as may be desired by the action of a revolving seed-box provided with a series of discharge-openings, which are regulated to different seeds or fertilizers and to the quantity which shall be distributed over a given area.

A represents a seed-box, made of sheet metal or any other suitable material, in the form of a cylinder or polygon, as clearly shown in the drawings, and attached to the axle C, which has its bearings in the wheels B. The bearings of the axle are fixed, so that the wheels are compelled to rotate with the axle, and as the machine is drawn over a field the seed-box is to revolve with the axle.

The seed or fertilizer to be discharged is distributed by means of holes $a$ in the circumference of the cylinder A, and these holes are regulated by means of slides D, with corresponding holes $a$ in the cylinder or seed-box, so that said holes are partially or entirely closed. The slides D are guided by flanges $b$, secured to the opposite ends of the cylinder, and they connect to a common sleeve, E, which slides on the axle C in a longitudinal direction. The position of this sleeve and of the several slides is regulated by a hand-lever, F, which has its fulcrum on a lug, $d$, projecting from the surface of the cylinder, and which connects, by means of a rod, $e$, with the levers $f$, that have their fulcra on pivots $g$ in lugs $h$, projecting from that head of the cylinder opposite the sleeve E, and which connect, by links $h'$, with said sleeve. By throwing the hand-lever F in the direction of the arrow marked near it in Fig. 2 the sleeve is drawn up closer toward the cylinder and the discharge-holes $a$ are opened, and by throwing the hand-lever in the opposite direction the sleeve is moved from the cylinder and the discharge-holes are partially or wholly closed. The hand-lever F is operated from the driver's seat G, which is supported by an arc, H, rising from a frame, I, which rests upon the axle, and from which the tongue or thills J extend, to which the draft animal or animals are hitched. This frame is connected to the axle C by means of braces $i$, which allow said axle to rotate freely, so that by the frame and thills the machine can be drawn over a field and the operation of sowing can be effected.

By the use of my revolving cylindrical seed-box seeds or fertilizers of any kind can be distributed either separate or mixed in stated quantities. By the action of the revolving cylinder plaster or any other similar article will be prevented from sticking or packing. It mixes grass-seed and plaster, or ashes and plaster, wheat and lime, or any other article by simply shutting off the delivery and revolving the cylinder for a short time until the mixture is effected; then open the slides and the composition is ready for using.

With this machine leached ashes can be distributed without subjecting them first to the operation of kiln-drying; and the discharge can be regulated from three quarts of grass seed to five bushels of ashes per acre.

In practice two or more hand-levers will be attached to the cylinder on different sides, so that the driver is enabled to reach one of them no matter what the position of the cylinder may be.

The size of the cylinder may, of course, be varied to suit customers, and the same will be provided with a door or lid, which can be easily opened, and gives access to the interior for the purpose of cleaning.

What I claim as new, and desire to secure by Letters Patent, is—

The adjustable sleeve E, in combination with the seed-slides D, revolving cylinders A, and hand-lever F, constructed and operating in the manner and for the purpose substantially as herein shown and described.

EDWARD S. JEWETT.

Witnesses:
E. H. CONGDON,
C. S. BARLOW.